US005805840A

United States Patent [19]
Dutton

[11] Patent Number: 5,805,840
[45] Date of Patent: Sep. 8, 1998

[54] BUS ARBITER EMPLOYING A TRANSACTION GRADING MECHANISM TO DYNAMICALLY VARY ARBITRATION PRIORITY

[75] Inventor: Drew J. Dutton, Austin, Tex.

[73] Assignee: Advanced Micro Devices, Inc., Sunnyvale, Calif.

[21] Appl. No.: 621,959

[22] Filed: Mar. 26, 1996

[51] Int. Cl.$^6$ .............................. G06F 13/26; G06F 13/18; G06F 13/34; G06F 13/366
[52] U.S. Cl. ........................... 395/296; 395/303; 395/861; 395/732
[58] Field of Search .................................... 395/296, 303, 395/860, 861, 732

[56] References Cited

U.S. PATENT DOCUMENTS

| | | | |
|---|---|---|---|
| 4,096,571 | 6/1978 | Vander Mey | 711/151 |
| 4,245,344 | 1/1981 | Richter | 395/183.19 |
| 4,339,808 | 7/1982 | North | 395/732 |
| 4,682,282 | 7/1987 | Beasley | 395/732 |
| 4,953,081 | 8/1990 | Feal et al. | 395/291 |
| 4,972,313 | 11/1990 | Getson, Jr. et al. | 395/305 |
| 4,974,148 | 11/1990 | Matteson | 395/559 |
| 5,146,596 | 9/1992 | Whittaker et al. | 395/296 |
| 5,245,322 | 9/1993 | Dinwiddie, Jr. et al. | 345/115 |
| 5,265,223 | 11/1993 | Brockmann et al. | 395/223 |
| 5,274,763 | 12/1993 | Banks | 395/308 |
| 5,345,566 | 9/1994 | Tanji et al. | 395/308 |
| 5,392,033 | 2/1995 | Oman et al. | 340/825.5 |

(List continued on next page.)

FOREIGN PATENT DOCUMENTS

| | | |
|---|---|---|
| 0 121 030 A1 | 10/1984 | European Pat. Off. |
| 0 625 753 | 11/1994 | European Pat. Off. |
| A 0 629 955 | 12/1995 | European Pat. Off. |
| 0 718 774 A1 | 6/1996 | European Pat. Off. |
| 2 165 726 | 4/1985 | United Kingdom . |
| 93/16434 | 8/1993 | WIPO . |
| 95/28786 | 10/1995 | WIPO . |

OTHER PUBLICATIONS

IBM Technical Disclosure Bulletin entitled, "Priority Management on a Shared Data Bus," vol. 34, No. 7a, Dec. 1991, New York, US, pp. 59–60.
Research Disclosure entitled, "Algorithm for Arbitration Priority Adjustment," No. 271, Nov. 1986, Emsworth, UK, p. 668.
IBM Technical Disclosure Bulletin, Oct. 1992, vol. 35, "Extended Micro Channel for Realtime Multimedia Applications", pp. 8–10.
IBM Technical Disclosure Bulletin, May 1989, vol. 31, "Priority Scheduling Algorithm", pp. 271–272.
PCI Local Bus Multimedia Design Guide, Revision 1.0, Mar. 29, 1994, pp. 1–40.
Peripheral Component Interconnect (PCI) Revision 1.0 Specification, Jun. 22, 1992, cover page and pp. 26–33.

(List continued on next page.)

Primary Examiner—Alyssa H. Bowler
Assistant Examiner—Jeffrey Allen Rossi
Attorney, Agent, or Firm—Conley, Rose & Tayon; B. Noel Kivlin

[57] ABSTRACT

A computer system includes a bus arbiter for controlling the ownership of a bus to which a variety of both real time and non-real time resources are coupled. The bus arbiter includes a request detection unit for detecting bus request signals of a plurality of bus masters, and a grant generator for generating corresponding grant signals to indicate a grant of ownership of the bus. A set of programmable registers are provided to receive configuration information for controlling the relative priority given to each of the bus masters when bus request contention occurs. One or more of the bus masters is configured to generate a grading signal following a particular bus transaction to indicate whether the latency in obtaining the bus during the previous bus request phase was generous, was acceptable, or was longer than desired (i.e., the latency requirement for the device was either violated or reached a critical or near-critical point). If the grading signal indicates the master desires faster access to the bus, the arbitration control unit increases a level of arbitration priority given to that master for future bus requests.

14 Claims, 5 Drawing Sheets

U.S. PATENT DOCUMENTS

| | | | |
|---|---|---|---|
| 5,396,602 | 3/1995 | Amini et al. | 395/293 |
| 5,404,463 | 4/1995 | McGarvey | 395/308 |
| 5,412,788 | 5/1995 | Collins et al. | 711/157 |
| 5,463,624 | 10/1995 | Hogg et al. | 370/461 |
| 5,467,454 | 11/1995 | Sato | 395/296 |
| 5,471,590 | 11/1995 | Melo et al. | 395/288 |
| 5,517,650 | 5/1996 | Bland et al. | 395/750 |
| 5,524,235 | 6/1996 | Larson et al. | 711/151 |
| 5,526,017 | 6/1996 | Wilkie | 345/115 |
| 5,533,205 | 7/1996 | Blackledge, Jr. et al. | 395/297 |
| 5,535,341 | 7/1996 | Shah et al. | 395/306 |
| 5,546,546 | 8/1996 | Bell et al. | 395/292 |
| 5,560,016 | 9/1996 | Fiebrich et al. | 395/728 |
| 5,572,686 | 11/1996 | Nunziata et al. | 395/296 |
| 5,574,867 | 11/1996 | Khaira | 395/293 |
| 5,583,999 | 12/1996 | Sato et al. | 395/280 |
| 5,592,631 | 1/1997 | Kelly et al. | 395/293 |
| 5,664,218 | 9/1997 | Kim et al. | 395/821 |

OTHER PUBLICATIONS

IBM Technical Disclosure Bulletin, vol. 38, No. 4, Apr. 1995; New York, US, pp. 535–538, XP002016389, "Micro-Channel Architecture For Rear–Time Multimedia".

IBM Technical Disclosure Bulletin, vol. 35, No. 5, Oct. 1992, New York, US, pp. 8–10, XP002016386, "Extended Microchannel for Realtime Multimedia Applications".

Patent Abstracts of Japan, vol. 14, No. 214 (P–1044), May 7, 1990 & JP, A, 02 048765 (NEC Corporation).

BUS ARBITER EMPLOYING A TRANSACTION GRADING MECHANISM TO DYNAMICALLY VARY ARBITRATION PRIORITY

BACKGROUND OF THE INVENTION

1. Field of the Invention

This invention relates to bus arbitration within computer systems and more particularly to a computer system having an improved bus arbiter for arbitrating bus accesses of a CPU, real time DSP hardware, and other system resources.

2. Description of the Relevant Art

Computer architectures generally include a plurality of devices interconnected by one or more buses. For example, conventional computer systems typically include a CPU coupled through bridge logic to a main memory. The bridge logic also typically couples to a high bandwidth local expansion bus, such as the Peripheral Component Interconnect (PCI) bus or the VESA (Video Electronics Standards Association) VL bus. Modern local bus standards such as the PCI bus and the VL bus are not constrained by a requirement to be backwards compatible with prior expansion bus adapters and thus provide much higher throughput than older expansion buses. Examples of devices which can be coupled to local expansion buses include SCSI adapters, network interface cards, video accelerators, audio cards, telephony cards, etc. An older-style expansion bus may also be coupled to the local expansion bus to provide compatibility with earlier-version expansion bus adapters. Examples of such expansion buses include the industry standard architecture (ISA) bus, also referred to as the AT bus, the extended industry standard architecture (EISA) bus, and the microchannel architecture (MCA) bus. Various devices may be coupled to this second expansion bus, including a fax/modem, sound card, etc.

A CPU local bus arbiter as well as a PCI bus arbiter are typically included as part of the bridge logic in many computer systems. The CPU local bus arbiter determines and prioritizes ownership of the CPU local bus, while the PCI bus arbiter determines and prioritizes ownership of the PCI bus. Mastership of either bus is typically based on a fixed arbitration fairness scheme, such as a round-robin algorithm. In some situations, a master must acquire ownership of both the PCI bus and the CPU local bus before it can proceed with a particular transfer.

Computer systems were originally developed for business applications including word processing and spreadsheets, among others. Recently, computer systems have evolved toward more real time applications, including multimedia applications such as video and audio, video capture and playback, telephony, and speech recognition. Computer systems originally designed for business applications, however, are not well suited for the real time requirements of modern multimedia applications. For example, current operating systems for personal computers are usually not real time operating systems. In addition, the bus architecture of modern personal computer systems still presumes that the majority of applications executing on the computer system are non-real time, business applications such as word processing and/or spreadsheets which are executed solely by the main CPU.

Another problem associated with modern computer systems is that the bus arbiter which arbitrates between real time resources, non-real time resources and the CPU is typically designed to provide the CPU with maximum availability to the system memory, or is otherwise not cognizant of the real time accesses of other bus mastering devices. Real time devices can accordingly be "starved" of data, particularly when a relatively large number of real time devices are included within the system. This can correspondingly result in degraded performance, unsynchronized audio and video, and the dropping of frames during video or animation sequences.

In addition, systems including bus arbiters that employ fixed arbitration priority schemes do not account for variations in the needs of various devices at different times. Such systems similarly do not account for changes in the system configuration, such as variations due to the addition or removal of one or more peripheral devices. A system is thus desirable wherein real time devices obtain adequate access to the system busses and wherein bus arbitration is dynamically varied to account for varying requirements of the system.

SUMMARY OF THE INVENTION

The problems outlined above are in large part solved by a computer system employing a bus arbiter having a transaction grading mechanism to dynamically vary arbitration priority in accordance with the present invention. In one embodiment, a computer system is provided that includes a bus arbiter for controlling the ownership of a bus to which a variety of both real time and non-real time resources are coupled. The bus arbiter includes a request detection unit for detecting bus request signals of a plurality of bus masters, and a grant generator for generating corresponding grant signals to indicate a grant of ownership of the bus. A set of programmable registers are provided to receive configuration information for controlling the relative priority given to each of the bus masters when bus request contention occurs. One or more of the bus masters is configured to generate a grading signal following a particular bus transaction to indicate whether the latency in obtaining the bus during the previous bus request phase was generous, was acceptable, or was longer than desired (i.e., the latency requirement for the device was either violated or reached a critical or near-critical point). If the grading signal indicates the master desires faster access to the bus, the arbitration control unit increases a level of arbitration priority given to that master for future bus requests. The grading signal thus provides feedback to the arbiter to adjust the priority given to the device for future transactions. Other devices may be configured to generate similar grading signals. In one embodiment, the arbitration control unit separately detects the grading signals of differing masters at separate dedicated lines. In another embodiment, a common grading signal bus is used to convey the grading signal associated with each master. In this embodiment, a master is configured to drive the bus with a valid grading signal a predetermined time after the master's request signal is deasserted.

Broadly speaking, the present invention contemplates a bus arbiter for controlling and prioritizing ownership of a bus comprising a request detection unit for detecting a plurality of bus request signals corresponding to designated bus masters, a grant generator for generating a plurality of bus grant signals, and an arbitration control unit. The arbitration control unit is configured to process contending bus requests received by the request detection unit and is further configured to adjust a level of arbitration priority given to a designated peripheral device depending upon a grading signal generated by the designated peripheral following a bus transaction effectuated by the designated peripheral.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
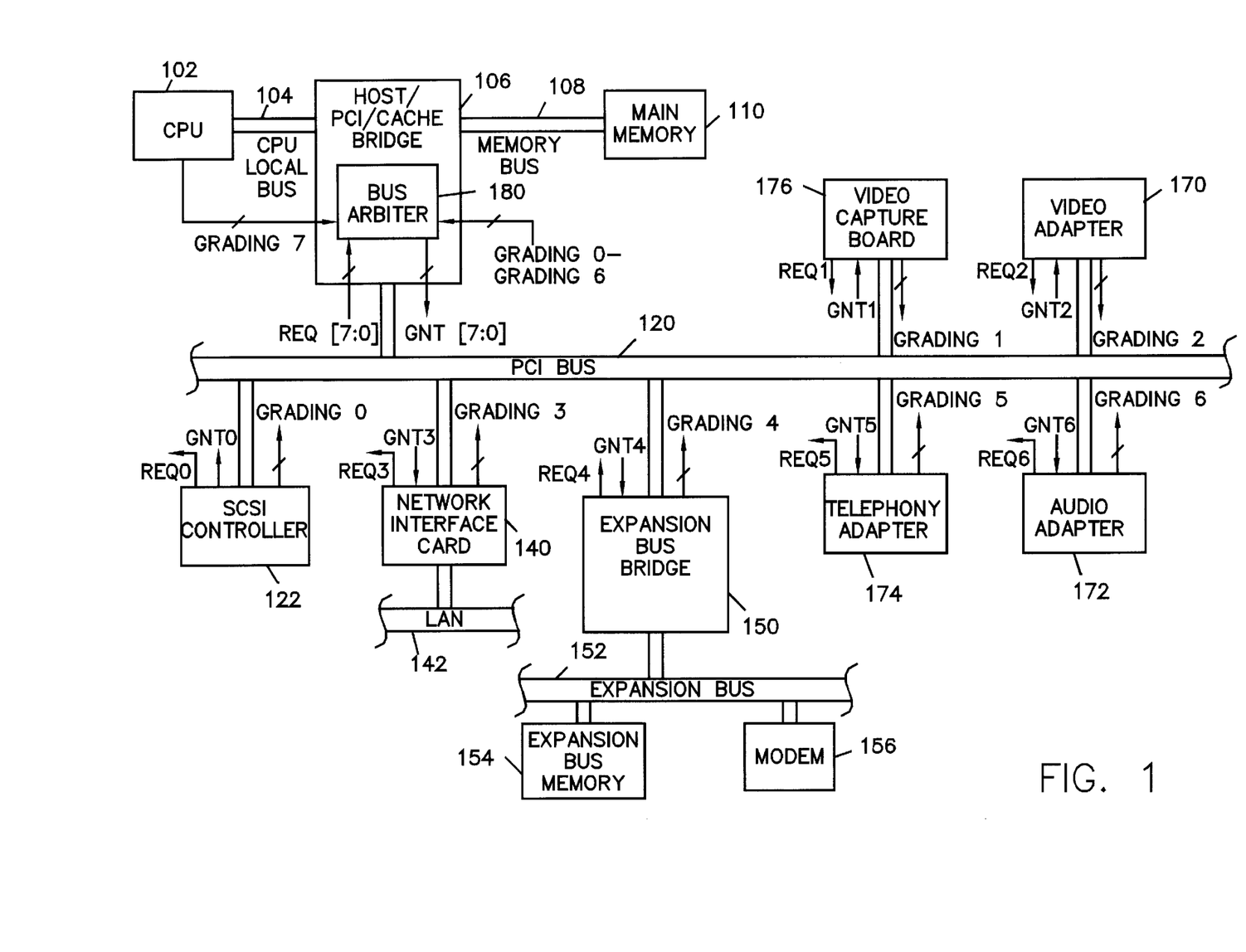
FIG. 1 is a block diagram of a computer system including a variety of real time resources and a bus arbiter in accordance with the present invention.

Referring now to FIG. 1, a block diagram of a computer system incorporating a plurality of bus devices and bus arbitration logic in accordance with the present invention is shown. As illustrated in the figure, the computer system includes a central processing unit (CPU) 102 which is coupled through a CPU local bus 104 to a host/PCI/cache bridge 106. The bridge 106 includes memory control logic and is coupled through a memory bus 108 to a main memory 110. A cache memory subsystem (not shown) may further be coupled to bus bridge 106.

Bus bridge 106 also interfaces to a peripheral component interconnect (PCI) bus 120. Further details regarding PCI bus 120 may be found within the publication "PCI Local Bus Specification"; Revision 2.0; Apr. 30, 1993; PCI Special Interest Group; Hillsboro, Oreg. This publication is incorporated herein by reference in its entirety. It is noted that other local buses could be alternatively employed, such as the VESA (Video Electronics Standards Association) VL bus.

CPU 102 is illustrative of, for example, an x86 microprocessor such as an 80486 microprocessor or a Pentium-compatible microprocessor. It is understood, however, that a system according to the present invention may employ other types of microprocessors. It is further understood that a system according to the present invention may be employed within a multiprocessing environment.

Various types of devices may be connected to the PCI bus 120. For the embodiment illustrated in FIG. 1, a video adapter 170 for controlling video functions is coupled to PCI bus 120. Other real time DSP devices are also preferably coupled to the PCI bus, including an audio adapter 172, a telephony adapter 174, and a video capture board 176, among others. A SCSI (small computer systems interface) disk controller 122 and a network interface card 140 are additionally shown coupled to the PCI bus 120. SCSI controller 122 is configured to provide an interface to SCSI devices such as a CD-ROM device, a tape drive device, and/or a composite disk array. The network interface card 140 interfaces to a local area network (LAN) 142.

An expansion bus bridge 150 is also preferably coupled to the PCI bus 120. The expansion bus bridge 150 interfaces to an expansion bus 152. The expansion bus 152 may be any of a variety of types, including the industry standard architecture (ISA) bus, also referred to as the AT bus, the extended industry standard architecture (EISA) bus, or the microchannel architecture (MCA) bus. Various devices may be coupled to the expansion bus 152, including expansion bus memory 154 and a modem 156.

A bus arbiter 180 configured to control ownership of PCI bus 120 is illustrated as a portion of bus bridge 106 The arbitration scheme employed by PCI bus 120 utilizes a unique request signal REQ# and grant signal GNT# for each PCI master. When a particular master desires ownership of PCI bus 120, it asserts its associated request signal REQ#. For example, request signal REQ2 is asserted by video adapter 170 when it requires ownership of PCI bus 120, and request signal REQ5 is asserted by telephony adapter 174 when it requires ownership of PCI bus 120, and so on. Corresponding grant signals GNT[7:0] are routed back to the masters from bus arbiter 180 to indicate the current owner of PCI bus 120. Each request signal/grant signal pair is referred to as a bus request channel. It is noted that request signal REQ4 may be asserted by expansion bus bridge 150 if access of PCI bus 120 is required by an agent of expansion bus 152, such as modem 156. It is further noted that a request signal REQ7 is generated internally by bridge 106 when it requires mastership of PCI bus 120.

FIG. 1 further illustrates a grading signal, (i.e., labeled "Grading0"–"Grading7") associated with each of the mastering devices of the PCI bus 120. As will be explained in further detail below, a particular bus master drives its grading signal following a bus transaction to indicate whether the latency in obtaining bus mastership for the transaction was acceptable, or was at a near critical or critical point, as determined by the bus master. Bus arbiter 180 detects the grading signal of the master and either increases the level of arbitration priority given to that master if the grading signal indicates that the previous transaction involved a latency which was at or near a critical point, or keeps the priority level at its current level if the grading signal indicates the latency for the previous cycle was acceptable. Additional levels of grading may further be indicated by each of the masters, such as an indication that the latency was better than required. For some situations wherein the latency was better than required, the arbitration control unit decreases the level of arbitration priority given to the device. Further details regarding bus arbiter 180 will be provided below in conjunction with the accompanying descriptions of FIGS. 2 and 3.

Figure 2:
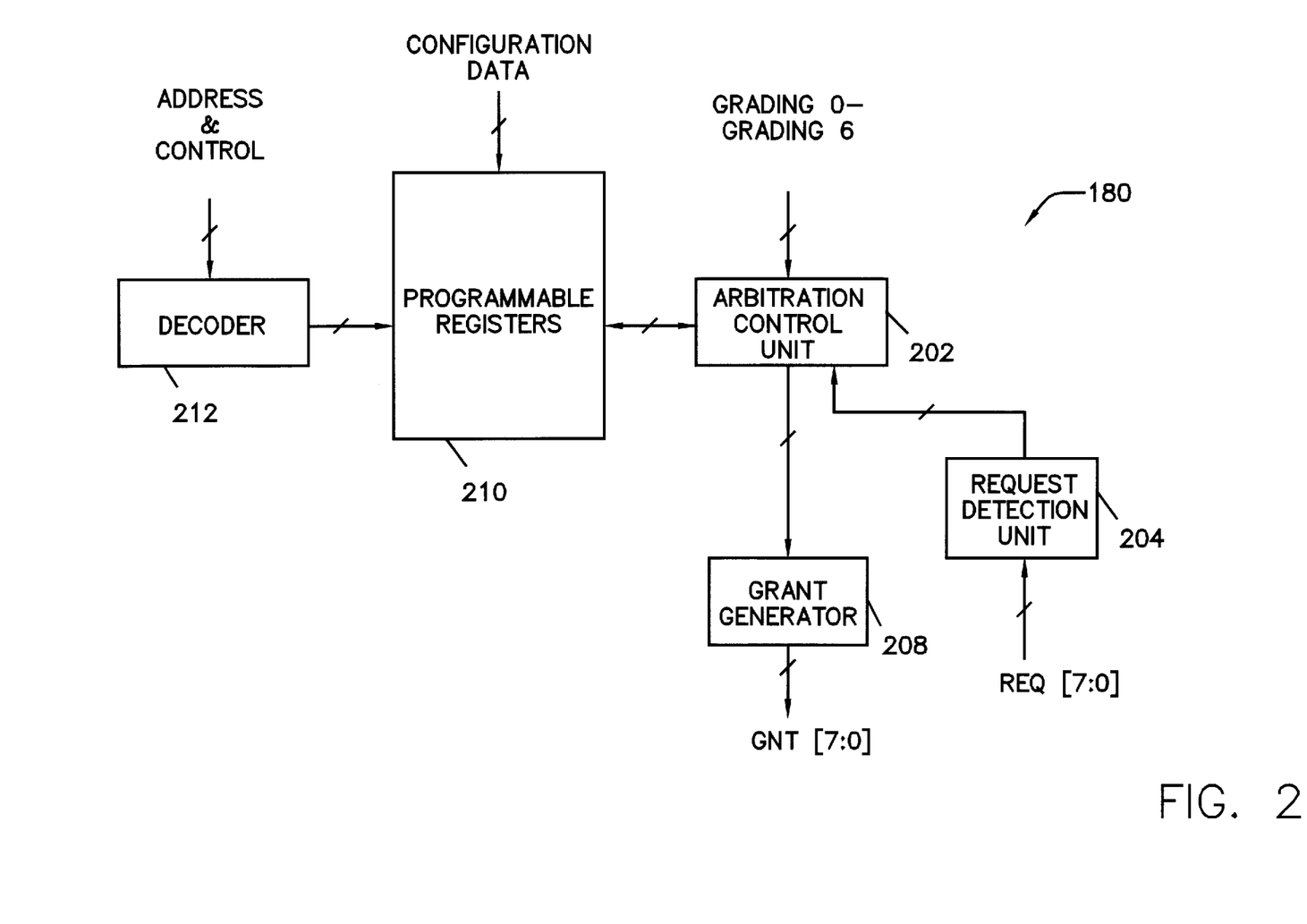
FIG. 2 is a block diagram which depicts internal portions of the bus arbiter of FIG. 1.

FIG. 2 is a diagram that depicts internal portions of one embodiment of bus arbiter 180. As shown, bus arbiter 180 includes an arbitration control unit 202 coupled to a request detection unit 204, a grant generator 208, and a programmable registers unit 210. A decoder is further shown coupled to programmable registers 210.

Request detection unit 204 is provided to detect assertions of request signals REQ0–REQ7, and to inform arbitration control unit 202 of such assertions. Grant generator 208 is similarly provided to selectively assert grant signals GNT0–GNT7 in response to commands from arbitration control unit 202. Programmable registers unit 210 is provided to store configuration data to set the priority level associated with each of the bus mastering devices controlled by bus arbiter 180. Programmable registers unit 210 may be accessed through software command via PCI bus 120 in conjunction with a decoder 212, and may include a plurality of registers.

Figure 3:
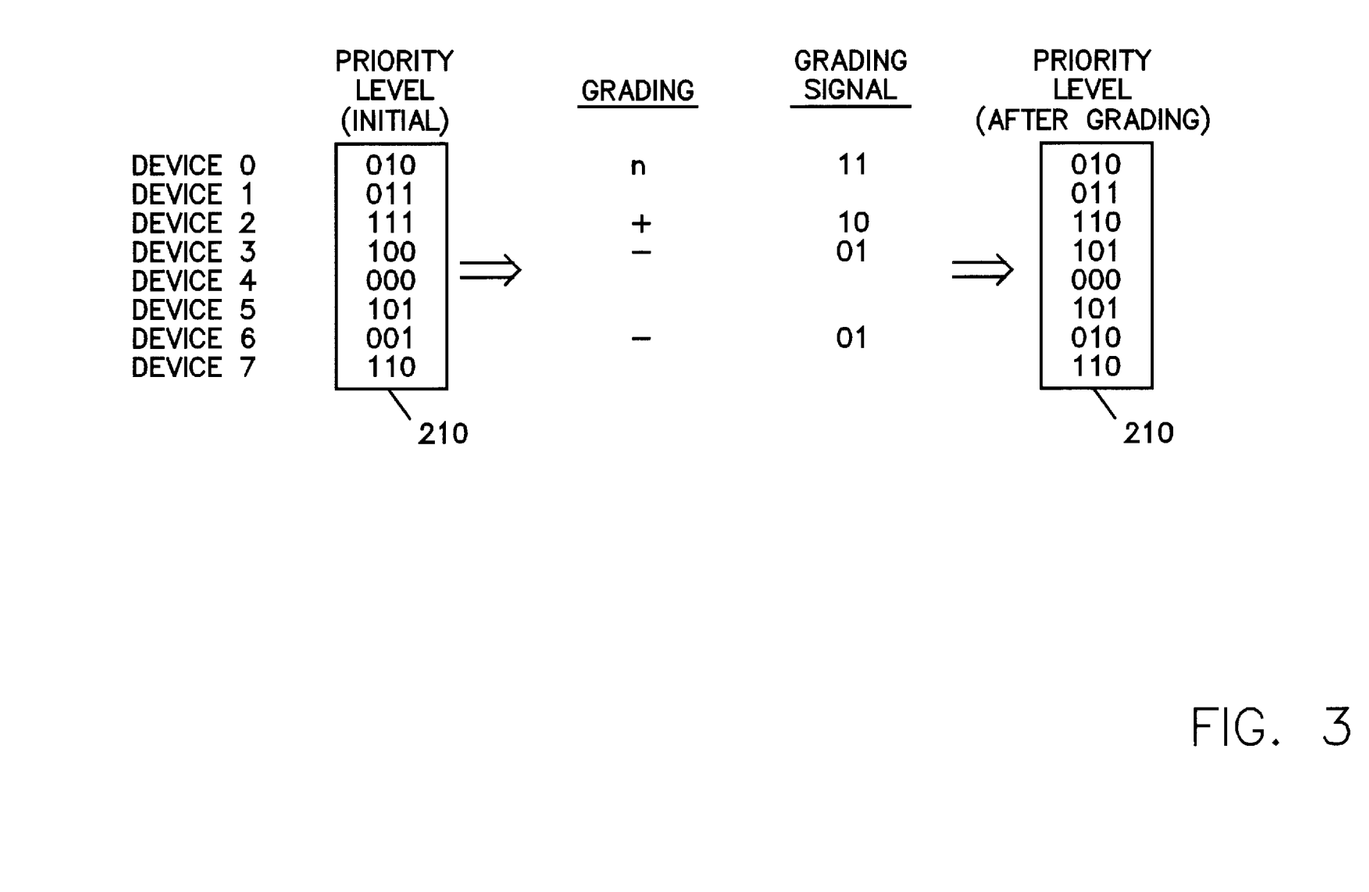
FIG. 3 is a diagram indicating exemplary initial priority levels associated with each of several bus mastering devices, a grading associated with selected ones of the devices, and a resulting priority level after grading is applied by the arbitration control unit of FIG. 2.

During operation of a computer system employing bus arbiter 180, programmable registers unit 210 is set such that an initial priority level is programmed for each bus master. For example, FIG. 3 illustrates exemplary values programmed within programmable registers unit 210 that set the initial priority levels associated with the devices (labelled "Device0 –Device7") corresponding to each of the request signals REQ[7:0]. In this embodiment, the higher the binary value, the higher the priority given for that device. Accordingly, as illustrated in FIG. 3, Device 2, which is associated with the request signal REQ2 (i.e., the video adapter at 170 of FIG. 1), is given the highest level of priority for arbitration purposes. Device 2 thus will initially gain access to the bus in favor of any other contending masters that are also requesting the bus at the same time. The initial priority level associated with each of the other devices is also shown. When more than one master contends for the bus at a particular time, the master having the highest associated priority level of those contending for the bus wins the arbitration.

FIG. 3 further illustrates a grading associated with transactions of several of the bus devices. As stated previously, after a particular device has gained access to the bus, the device provides a grading signal, (i.e., the signals labeled grading0–grading7 in FIG. 1) to indicate whether the latency requirement for the device was amply met (denoted by a "+" symbol), was acceptable (no grading applied), or was violated or at a near critical point (denoted by a "–" symbol). Thus, as illustrated within the exemplary situation of FIG. 3, after Device 2 had access to the bus, it provided a grading signal indicating that its latency requirement was amply met (in other words, that the device obtained the bus in ample time). As a result, the priority level for that device was responsively downgraded by one position by arbitration control unit 202. It is noted that arbitration control unit 202 may be configured to downgrade the arbitration priority for a particular device in this manner only if other conditions are also met. For example, in one embodiment arbitration control unit 202 downgrades the arbitration priority for a particular device in response to the device indicating that its latency requirements were amply met and if at least a predetermined number of other devices, such as two other devices, were simultaneously requesting the bus. In this manner, the arbitration priority of a device is not lowered if it was not in a contention for the bus with at least the predetermined number of devices Following a transaction on PCI bus 120 by Device 3, as illustrated in FIG. 3, Device 3 generated a grading signal indicating that its latency requirement was violated (or was at a near critical point). The priority level for Device 3 was accordingly upgraded by arbitration control unit 202. A similar adjustment to the priority level associated with Device 6 was also applied in the exemplary situation of FIG. 3. Device 0 provided a neutral grading, and thus the priority level for Device 0 was held constant. Subsequent transactions are treated similarly.

As a result of the computer system described above, the priority level associated with various devices is dynamically adjusted based upon the grading signals (which are indicative of the past performance of the arbiter). The arbitration control unit 202 thus receives feedback to determine how to arbitrate future requests by the various devices.

Figure 4:
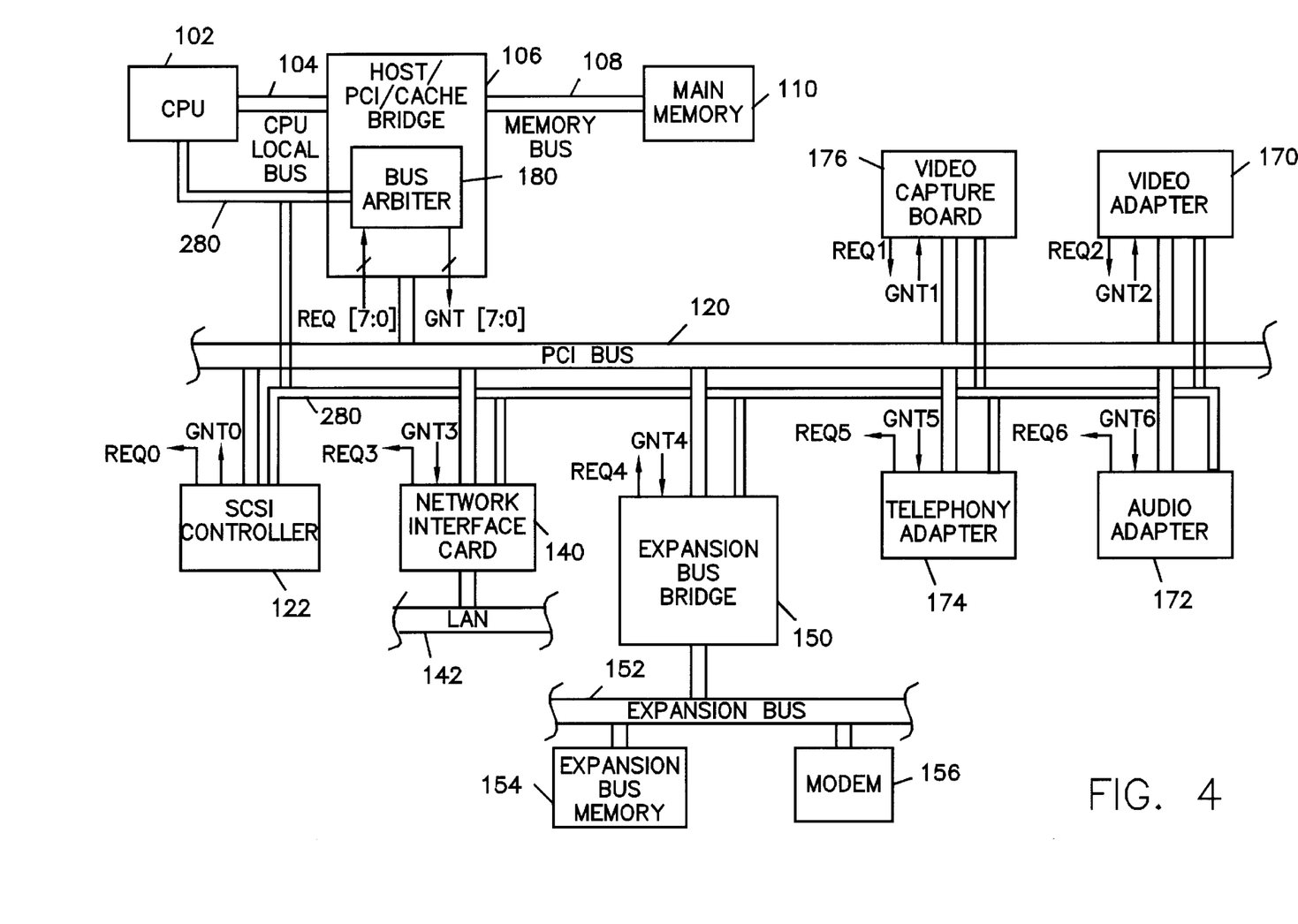
FIGS. 4 and 5 are block diagrams of a system including a common grading signal bus for conveying the grading signals of various devices.
Figure 5:
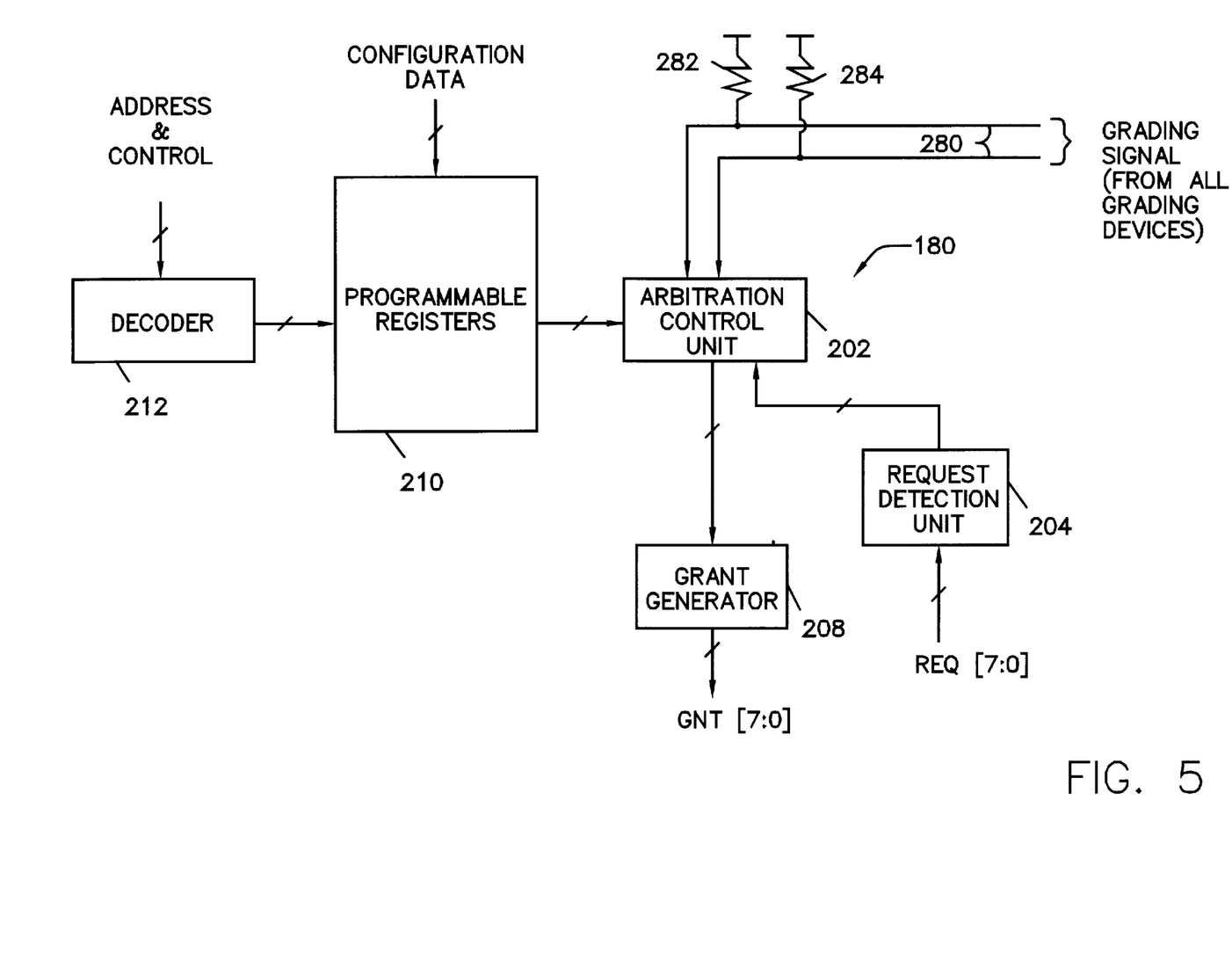

For the embodiment of FIG. 2, a separate grading signal is generated by each bus mastering device, and is separately routed to and detected by arbitration control unit 202. It is noted that the grading system for a particular device may be generated at any point after ownership of the bus is granted to a device. In an alternative configuration, as illustrated in FIGS. 4 and 5, a grading signal from each device is provided to a common grading signal bus 280. The system is configured such that a device drives the bus 280 with a valid grading signal a predetermined time after the grant signal for that device was asserted, such as two clock cycles. Arbitration control unit 202 samples the value driven on bus 280 when a valid grading signal is driven on the bus, (i.e., at the predetermined time after the grant signal was asserted), and associates the grading signal with the device that was granted bus ownership. A valid grading signal may alternatively be driven on bus 280, a predetermined time after the grant signal for that device is deasserted (i.e., after bus ownership is terminated). It is noted that for the embodiment of FIG. 5, the grading signal of each device is a 2-bit signal, and each line of bus 280 is passively pulled high via resistors 282 and 284 respectively. Thus, if no devices are driving a grading signal on bus 280, both lines will be high. If arbitration control unit 202 samples the value on the bus and both lines of the bus are high, no change will be made to the priority level of any of the devices. Accordingly, devices that do not generate a grading signal may still be employed within the system. The system of FIGS. 4 and 5 advantageously allows the conveyance of the grading signal from each device to the bus arbiter while minimizing the number of transmission lines required in the system as well as the number of pins required to implement bus arbiter 180.

Numerous variations and modifications will become apparent to those skilled in the art once the above disclosure is fully appreciated. It is intended that the following claims be interpreted to embrace all such variations and modifications.

What is claimed is:

1. A bus arbiter for controlling and prioritizing ownership of a bus comprising:

a request detection unit for detecting a plurality of bus request signals corresponding to designated bus masters;

a grant generator for generating a plurality of bus grant signals; and an arbitration control unit coupled said request detection unit and to said grant generator, wherein said arbitration control unit is configured to process contending bus requests received by said request detection unit;

wherein said arbitration control unit is further configured to adjust a level of arbitration priority given to a designated peripheral device depending upon a grading signal generated by said designated peripheral following a bus transaction effectuated by said designated peripheral;

wherein said bus arbiter further includes a grading signal bus coupled to said arbitration control unit, wherein said grading signal bus is configured to convey grading signals from different peripheral devices; and wherein said arbitration control unit is configured to sample said grading signal bus a predetermined time after ownership of said bus by said designated peripheral is terminated.

2. The bus arbiter as recited in claim 1 wherein said arbitration control unit is configured to increase a level of arbitration priority given to said designated peripheral if said grading signal indicates a latency in obtaining mastership of said bus was excessive.

3. The bus arbiter as recited in claim 1 further comprising a programmable storage unit coupled to said arbitration control unit, wherein said programmable storage unit is configured to store an initial arbitration priority level associated with said designated peripheral.

4. The bus arbiter as recited in claim 3 wherein said programmable storage unit includes a plurality of registers.

5. The bus arbiter as recited in claim 3 further comprising a decoder coupled to said programmable storage unit, wherein said decoder is configured to decode an address signal to thereby allow a setting of said initial arbitration priority level.

6. The bus arbiter as recited in claim 3 further comprising a decoder coupled to said programmable storage unit, wherein said decoder is configured to decode an address signal to thereby allow a setting of said initial arbitration priority level stored within said programmable storage unit.

7. The bus arbiter as recited in claim 1 wherein said grading signal is provided to said arbitration control unit upon a dedicated line coupled between said designated peripheral and said bus arbiter.

8. A computer system comprising:
    a first master coupled to a bus;
    a second master coupled to said bus;
    a bus arbiter for controlling and prioritizing ownership of said bus including:
        a request detection unit for detecting a first request signal of said first master and a second request signal of said second master;
        a grant generator for generating a plurality of bus grant signals; and
        an arbitration control unit coupled said request detection unit and to said grant generator, wherein said arbitration control unit is configured to process contending bus requests received by said request detection unit;
    wherein said arbitration control unit is further configured to adjust a level of arbitration priority given to said first master depending upon a grading signal generated by said first master following a bus transaction effectuated by said first master;
    wherein said bus arbiter further includes a grading signal bus coupled to said arbitration control unit, wherein said grading signal bus is configured to convey grading signals from different peripheral devices; and
    wherein said arbitration control unit is configured to sample said grading signal bus a predetermined time after ownership of said bus by said designated peripheral is terminated.

9. The computer system as recited in claim 8 wherein said first master is configured to assert a first request signal to request ownership of said bus and wherein said second master is configured to assert a second request signal to request ownership of said bus.

10. The computer system as recited in claim 8 wherein said bus is a PCI bus.

11. The computer system as recited in claim 8 wherein said first master is an audio adapter.

12. The computer system as recited in claim 8 wherein said arbitration control unit is configured to increase a level of arbitration priority given to said first master in response to said grading signal indicating a latency associated with a prior transition of said first master was inadequate.

13. The computer system as recited in claim 8 further comprising a programmable storage unit configured to store an initial arbitration priority level associated with said first master.

14. The computer system as recited in claim 13 wherein said programmable storage unit includes a plurality of registers.

* * * * *